Feb. 2, 1960  R. A. KULOW  2,923,082
VISUAL SIGNAL MEANS FOR FISHING POLE HOLDERS
Filed March 7, 1958  2 Sheets-Sheet 1
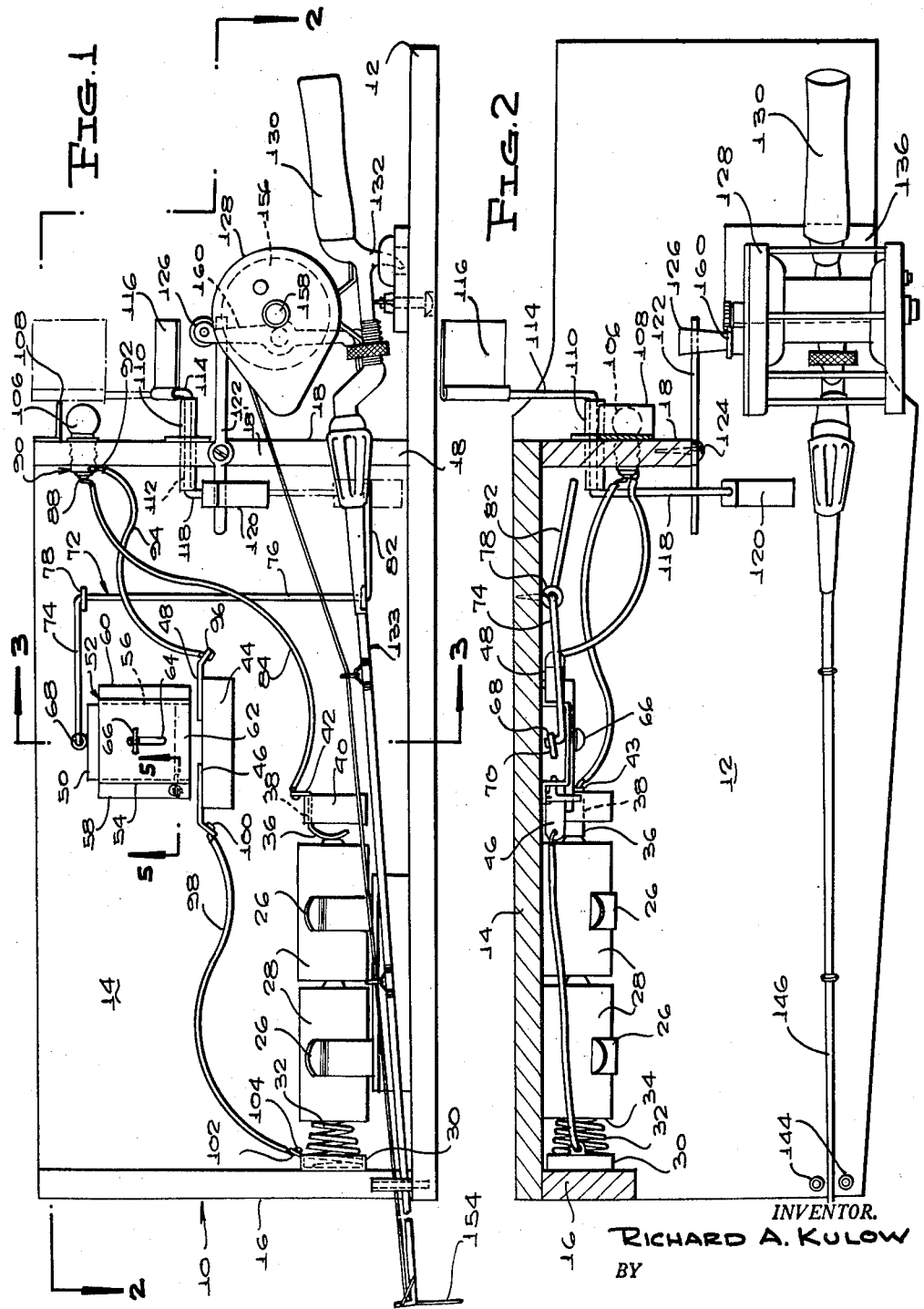
INVENTOR.
RICHARD A. KULOW
BY
McMorrow, Berman & Davidson
ATTORNEYS Feb. 2, 1960 R. A. KULOW 2,923,082
VISUAL SIGNAL MEANS FOR FISHING POLE HOLDERS
Filed March 7, 1958 2 Sheets-Sheet 2
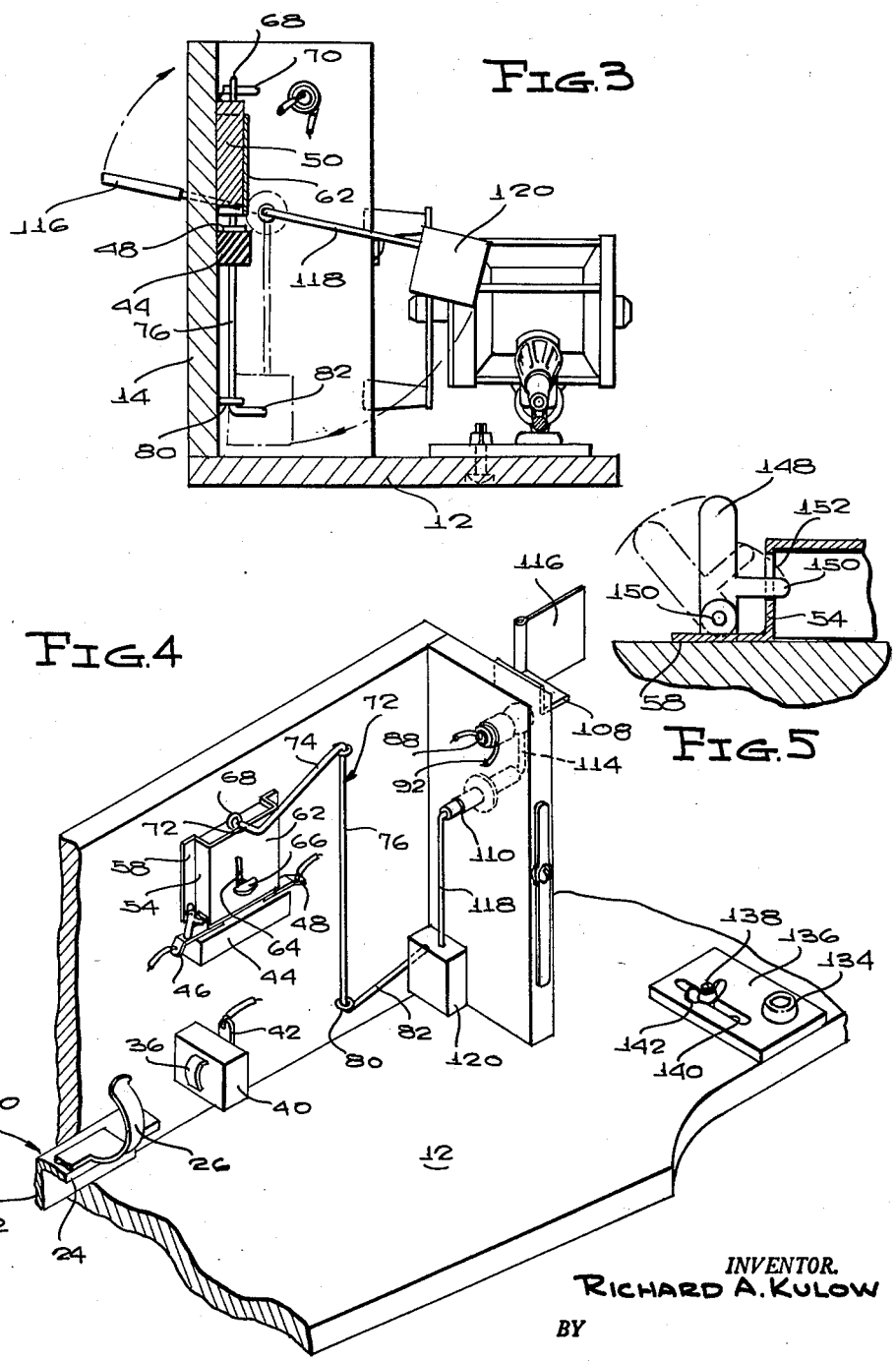
INVENTOR.
RICHARD A. KULOW
BY
McMorrow, Berman & Davidson
ATTORNEYS

United States Patent Office 2,923,082
Patented Feb. 2, 1960

2,923,082

VISUAL SIGNAL MEANS FOR FISHING POLE HOLDERS

Richard A. Kulow, Plymouth, Wis.

Application March 7, 1958, Serial No. 719,857

5 Claims. (Cl. 43—17)

This invention relates to sports and, more specifically, the present invention pertains to a fishing pole holder together with means for visually signalling to the fisherman when a fish has taken the bait.

One of the primary objects of this invention is to provide a fishing pole holder with means for visually signalling to the fisherman that a fish has taken the bait, the aforesaid means including an electric light and a flag.

A further object of this invention is to provide a fishing rod holder for an unattended fishing rod with means for indicating to the fisherman that a fish has taken the bait, the indicating means including a flag and an electric circuit including an electric light, and means for rendering the electric circuit de-energized during day time.

This invention contemplates, as still another object thereof, the provision of visual signal means for an unattended fishing pole for visually signalling the fisherman that the bait has been taken, the aforesaid means being actuated by the rotation of the reel handle as the line is payed out from the reel.

Still another object of this invention is to provide a fishing rod holder of the type generally described above, the fishing rod or pole holder being non-complex in construction and assembly, inexpensive to manufacture, and durable in use.

Other and further objects and advantages of the present invention will become more evident from a consideration of the following specification when read in conjunction with the annexed drawings, in which:

Figure 1 is a side elevational view of a fishing rod or pole holder constructed in accordance with the present invention;

Figure 2 is a top plan view of the fishing rod or pole holder illustrated in Figure 1, partly in cross-section, Figure 2 being taken substantially on the horizontal plane of line 2—2 of Figure 1, looking in the direction of the arrows;

Figure 3 is a detail cross-sectional view, partially in end elevation, Figure 3 being taken substantially on the vertical plane of line 3—3 of Figure 1, looking in the direction of the arrows;

Figure 4 is a fragmentary perspective view illustrating the indicating flag in its raised position and with the switch for the electric circuit in its closed circuit energizing postion; and, Figure 5 is an enlarged detail cross-sectional view taken substantially on the horizontal plane of line 5—5 of Figure 1, looking in the direction of the arrows, and illustrating the means employed for rendering the electric circuit inoperative during the day time.

Referring now more specifically to the drawings, reference numeral 10 designates, in general, a fishing rod or pole holder constructed in accordance with the teachings of the present invention. The pole holder 10 is seen to comprise an elongated substantially rectangular base 12 having a vertically extending side wall 14 rigidly secured to one of the longitudinally extending marginal edges thereof, the side wall 14 extending inwardly from an end of the base 12 and terminating at a point adjacent to but spaced from the opposed end. To the base 12 and to the opposite ends of the side 14 are rigidly secured a pair of end walls 16, 18. As is seen in the drawings, the end walls 16, 18 extend transversely across only a portion of the base 12 and are disposed in spaced, confronting and substantially parallel relation relative to each other.

An elongated angle bracket 20 has a side thereof 22 fixedly secured to the side wall 14 adjacent the end wall 16. The other side 24 of the bracket 20 extends laterally from the side wall 14 and projects over the base 12 substantially parallel thereto, the side 24 having rigidly secured thereto a pair of resilient battery clips 26. Batteries 28 are interposed between the side wall 14 and the clips 26 and are connected in series. A substantially hollow cylindrical spring seat 30 is rigidly secured to the end wall 16 in substantially coaxial alignment with the batteries 28. The seat 30 is adapted to receive one end of a helicoidal spring 32 under compression, the other end of the spring engaging against the base 34 of one of the batteries 28, the spring 32 constantly biasing the batteries 28 for movement towards a downwardly curved contact plate 36 formed of copper or of any other metallic material having a high degree of electrical conductivity. As is clearly seen in Figures 1 and 4, the upper end of the plate 36 continues into a bight portion 38 which extends through a support block 40 formed of a dielectric material such as, for example, a non-conducting plastic, and the bight 38, at its other end, terminates in a vertically extending flange 42.

A substantially rectangular switch base in designated at 44 and is formed of a non-conductive material such as, for example, non-conductive plastics and the like, the base 44 being rigidly secured to the side wall 14 by conventional means (not shown). Supported on the base 44 are a pair of longitudinally spaced apart substantially rectangular switch contact plates 46, 48 which are adapted to be bridged and engaged by the lower end of an elongated substantially rectangular metallic switch arm 50. As is clearly seen in Figures 1 and 4, the switch arm 50 is mounted for reciprocation within a vertically elongated hollow U-shaped channel member 52 having a pair of opposed open ends. The side walls 54, 56 of the U-shaped channel member 52 terminate in outwardly diverging flanges 58, 60 which are rigidly secured to the side wall 14 by conventional means (not shown). To serve a function to be described, the bight 62 of the U-shaped channel member 52 is formed with an elongated vertically extending slot 64 through which projects a manually manipulative lever 66 rigidly connected with the switch arm 50. The upper end of the switch arm 50 has rigidly secured thereto an annular member 68 which releasably receives therethrough one end 70 (see Figure 3) of a wire trigger designated at 72. The end 70 of the trigger 72 is integrally connected with a normally horizontal portion 74 which is bent at right angles intermediate its ends to form a vertical length 76 which is extended through an eye screw 78 rigidly secured to the side wall 14. The lower end of the extension 76 passes through a second eye screw 80 disposed adjacent to but spaced from the bottom wall or base 12, and is again bent to form a trigger arm 82, the free end of which terminates adjacent to but spaced from the end wall 18. The trigger arm 82 is also bent out of alignment with the portion 74 to form an obtuse angle therebetween.

One end of a wire 84 is rigidly secured to the flange 42 while the other end of the wire 84 is electrically connected to one side 88 of an electric light socket 90. The other side of the socket 90 is electrically connected at 92 with one end of a wire 94 whose other end is electrically connected at 96 with the switch contact plate 48. A wire 98 has one of its ends electrically connected at 100 with the switch contact plate 46 and its other end 102 electrically connected to a flange 104 which extends radially from the spring seat 30. As is clearly seen in Figures 1 and 4, the socket 90 is mounted adjacent the upper end of the end wall 18 and releasably receives therein a conventional electric light 106 over which is disposed a shield 108 rigidly secured to and supported by the end wall 18.

From the foregoing description it now becomes evident that when the switch arm 50 is moved from its elevated position shown in Figure 1, to its closed position as illustrated in Figure 4, an electric circuit has been established to effect illumination of the light 106. Conversely, when the switch arm 50 is moved to its elevated position out of contact with the switch contact plates 46, 48, the electric circuit to the light 106 becomes deenergized.

The end wall 18 intermediate the opposed ends thereof, carries a transversely extending elongated substantially hollow cylindrical journal 110 through which extends for rotation therein a substantially hollow cylindrical shaft 112. One end of the shaft 112 is bent at right angles to form a standard 114 on which is fixedly secured an indicating flag 116. The other end of the shaft 114 is also bent at right angles to provide a second standard 118 to the lower end of which is connected a weight 120.

An elongated substantially rectangular lever 122 is pivotally connected at 124 to the outer edge 18' of the end wall 18 intermediate the top and bottom ends thereof. As is clearly seen in Figures 1 and 2, one end of the lever 122 projects toward the end wall 16 and into the path of movement of the standard 118. The other end of the lever 122 projects to the other side of the end wall 18 and is normally engaged by the roller handle 126 of a reel 128 mounted by conventional means on a handle 130 of a conventional fishing rod or pole 133. The handle 130 includes a depending guard 132 which is releasably received within an enlarged hollow boss 134 fixedly secured to an adjusting plate 136 superimposed over the base 12. Adjustment of the plate 136 is effected by means of a bolt 138 which projects transversely through the base 12 and a slot 140 formed in the plate 136. The plate 136 is maintained in its adjusted position by means of a manually manipulative wing nut 142 which is threaded on the bolt 138 and spans the slot 140.

A pair of vertically extending substantially cylindrical collars 144 are fixedly secured to that end of the base 12 adjacent the end wall 16 in laterally spaced relation and receive therebetween the tip end 146 of the fishing rod or pole 133.

Means for rendering the switch arm 50 inoperative during day time are illustrated in detail in Figure 5. As illustrated therein, these means comprise an elongated substantially rectangular lever 148 pivotally mounted at 150 on the flange 58. As is illustrated in this figure, the lever 148 carries a laterally projecting tongue 150 which is adapted to be pivoted into and out of the U-shaped channel member 52 through a slot 152 formed in the side wall 54. With the lever 148 in its full line position, the tongue 150 is adapted to engage below the lower end of the switch arm 50 and to prevent the descent thereof upon actuation of the trigger wire 72 in a manner to be described below.

Having described in detail all of the component elements of this invention, the operation thereof is set forth as follows.

Assuming that the component elements of the invention are in their respective full line positions as is illustrated in Figures 1 to 3, inclusive, and further assuming that the lever 148 is in the full line position illustrated in Figure 5, a fish upon striking the bait connected to the free end of the fish line 154 will cause the same to be payed out from the reel 128. As the reel drum 156 rotates about the shaft 158 the lever 160 on which the handle 126 is supported rotates in a clockwise direction as viewed in Figure 1. This causes the handle member 126 to ride off the adjacent end of the lever 122 whereby the lever 122 rotates in a counterclockwise direction under the influence of the weight 120. The weight 120 now being free rotates downwardly and in so doing raises the flag 116 from its inclined position of Figure 1 to the substantially vertical position illustrated in Figure 4. However, the inertia of the weight 120 carries the same beyond its dead center position and causes the same to strike against the trigger arm 82 of the trigger wire 72. This action causes the trigger wire 72 to rotate and withdraws the end 70 thereof from the annular member 68 thus freeing the switch arm 50. However, since the tongue 150 is disposed immediately below the lower end of the switch arm 50 no movement thereof will occur. It is assumed that under the above described conditions, the fishing is being done during the daylight hours, and the fisherman, upon noting the now raised flag 116 will now attend the rod or pole 133 and will reel in the fish in the conventional manner.

Now let it be further assumed that the fishing is being done at night and that the component elements of this invention are in their respective full line positions as referred to above, but in addition thereto let it also be assumed that the fisherman has rotated the lever 148 to cause withdrawal of the tongue 150 from the U-shaped channel member 52. Under these conditions a fish striking the bait on the line 154 will cause the handle member 126 to again disengage itself from the lever 122 and the weight 120 will then swing downwardly in the manner described supra. This will again cause the flag 116 to move to its upright position as shown in Figure 4 and, substantially simultaneously therewith, the weight 120 upon striking the trigger arm 82 of the trigger wire 72 frees its end 70 from within the annular member 68 permitting the switch arm 50 to drop and engage across the switch contact plates 46, 48 thereby establishing the above described electric circuit to the lamp 106. With the circuit energized, the lamp 106 is illuminated and immediately indicates to a night fisherman that the bait has been taken by a fish. The fisherman now attends the fishing rod or pole 133 and reels in the fish as before and thereafter resets the lever 122, handle member 126 and weight 120 and subsequently thereto rotates the wire trigger to effect reinsertion of its end 70 into the annular member 68 after first raising the switch 50 by means of the lever 66.

The transverse adjustability of the plate 136 permits this rod or pole holding device to be utilized in conjunction with reels the axial length of the drums of which may have varying lengths.

Having described and illustrated in detail one embodiment of this invention, it will be understood that the same is offered merely by way of example, and that the present invention is to be limited only by the scope of the appended claims.

What is claimed is:

1. A signaling appliance for use in fishing including a holder for a fishing rod or pole having a reel mounted thereon, said holder comprising a substantially rectangular base having a side wall and a pair of opposed upright end walls, an electric light mounted on one of said end walls, an electric switch mounted on said side wall and normally biased to its closed position, an electric series circuit including said light, said switch and a source of E.M.F., means mounted on said side wall normally holding said switch in its open position, said last named means comprising a rotatable trigger arm, a shaft journalled for rotation on said one end wall, said shaft terminating at its opposed ends in a pair of standards extending in opposite directions therefrom and disposed one on each side of said one end wall, an indicating flag secured to one of said standards, a weight fixedly secured to the other of said standards, said weight being pivotal to engage said trigger arm to release said switch for movement to its closed position, means for holding said weight in an elevated position, said last named means comprising a lever pivotally mounted intermediate its ends on an edge of said one side wall with the ends thereof normally extending on opposite sides thereof, said lever having an end thereof engageable beneath said other standard, and means releasably supporting said fishing rod on said base proximate said last named lever to engage a reel handle over the other end of said last named lever whereby to releasably latch said weight in its said elevated position, said handle being disengaged from said other end of said last named lever upon the paying out of the line on said reel permitting said weight to drop and energize said circuit and simultaneously therewith to elevate said flag.

2. A signaling appliance for use in fishing including a holder for a fishing rod or pole having a reel thereon, said holder comprising a substantially rectangular base having a side wall and pair of opposed upright end walls, an electric light mounted on one of said end walls, an electric switch mounted on said side wall, said electric switch including a pair of spaced switch contact elements and a metallic switch arm mounted for reciprocation on said side wall above said switch contact elements, means for holding said switch arm in its normally open elevated position above said switch contact elements, an electric series circuit including said light, said switch and a source of E.M.F., said last named means comprising a rotatable trigger arm, a shaft journalled for rotation on said one end wall, said shaft terminating at its opposed ends in a pair of standards extending in opposite directions therefrom and disposed one on each side of said one end wall, an indicating flag secured to one of said standards, a weight fixedly secured to the other of said standards, said weight being pivotal to engage said trigger arm to release said switch for movement to its closed position across said switch contact elements, means for holding said weight in elevated position, said last named means comprising a lever pivotally mounted intermediate its ends on an edge of said one side wall with the ends thereof normally extending on opposite sides of said one side wall, said lever having an end thereof engageable beneath said other standard, and means releasably supporting said fishing rod on said base proximate said last named lever to engage a reel handle over the other end of said last named lever to releasably latch said weight in its said elevated position, said handle being disengaged from said other end of said last named lever upon the paying out of the line on said reel thereby permitting said weight to drop and engage said trigger arm to effect energization of said circuit and simultaneously therewith to elevate said flag.

3. An appliance as defined in claim 2, and means mounted on said side wall for holding said switch arm in its open position when said trigger arm is actuated.

4. An appliance as defined in claim 3, and said last named means comprising a lever pivotally mounted on said side wall for engagement by the lower end of said switch arm to prevent said switch arm from moving to its closed position.

5. A signaling appliance for use in fishing including a holder for a fishing rod or pole having a reel thereon comprising a substantially rectangular base having a side wall and a pair of opposed upright end walls, indicating means for visually indicating that the bait connected to the line carried on said reel has been taken, said means comprising a shaft journalled for rotation on said one end wall, said shaft terminating at its opposed ends in a pair of standards extending in opposite directions therefrom and disposed one on each side of said one end wall, an indicating flag secured to one of said standards, a weight fixedly secured to the other of said standards, means for holding said weight in elevated position, said last named means comprising a lever pivotally mounted intermediate its ends on an edge of said one side wall with the ends thereof normally extending on opposite sides of said side wall, said lever having an end thereof engageable beneath said other standard, and means releasably supporting said fishing rod on said base proximate said last named lever to engage a reel handle over the other end of said last named lever to releasably latch said weight in its said elevated position, said handle being disengaged from said other end of said last named lever upon the paying out of the line on the reel thereby permitting said weight to drop and simultaneously therewith raise said flag.

References Cited in the file of this patent
UNITED STATES PATENTS 2,725,659     Marzano              Dec. 6, 1955